United States Patent
Mitsuhashi et al.

[11] Patent Number: 6,112,180
[45] Date of Patent: Aug. 29, 2000

[54] DATA TRANSMISSION AND RECEPTION METHODS AND DATA TRANSMISSION AND RECEPTION APPARATUS

[75] Inventors: Takamichi Mitsuhashi, Saitama; Hiroshige Okamoto, Kanagawa; Toyohiko Otsu, Tokyo, all of Japan

[73] Assignee: Sony Corporation, Tokyo, Japan

[21] Appl. No.: 09/058,525

[22] Filed: Apr. 10, 1998

[30] Foreign Application Priority Data

Apr. 15, 1997 [JP] Japan ................................. 9-097548

[51] Int. Cl.$^7$ ................................................ G10L 13/00
[52] U.S. Cl. ........................................ 704/270; 704/201
[58] Field of Search ................................. 704/270, 200, 704/201, 500, 212, 276, 235, 272, 274

[56] References Cited

U.S. PATENT DOCUMENTS

| | | |
|---|---|---|
| 4,020,461 | 4/1977 | Adams et al. ........................... 340/146 |
| 4,241,266 | 12/1980 | Orban ........................................ 307/237 |
| 5,465,240 | 11/1995 | Mankovitz .................................. 369/1 |
| 5,778,073 | 7/1998 | Busching et al. ......................... 380/33 |

*Primary Examiner*—Richemond Dorvil
*Attorney, Agent, or Firm*—Limbach & Limbach, LLP

[57] ABSTRACT

The invention provides data transmission and reception methods and apparatus by which timer reservation of a program can be performed readily. A data signal including program information generated from a program information generation section is added to modulate an audio information signal supplied from an audio signal supply section by an addition modulation section. In the addition modulation, the audio information signal is phase modulated at a delineating point of sound thereof such as chimes or musical sound with the data signal. Together with the audio information signal phase modulated with the data signal, the audio information signal prior to the phase modulation is transmitted as a reference signal to be used for demodulation.

22 Claims, 13 Drawing Sheets

VARIATION OF DELAY (ROTATION) AMOUNT OF PHASE OF PHASE SHIFTER 2
(REPEATS LIKE A→B→C→A→B→C→A→ ··· )

F I G. 17
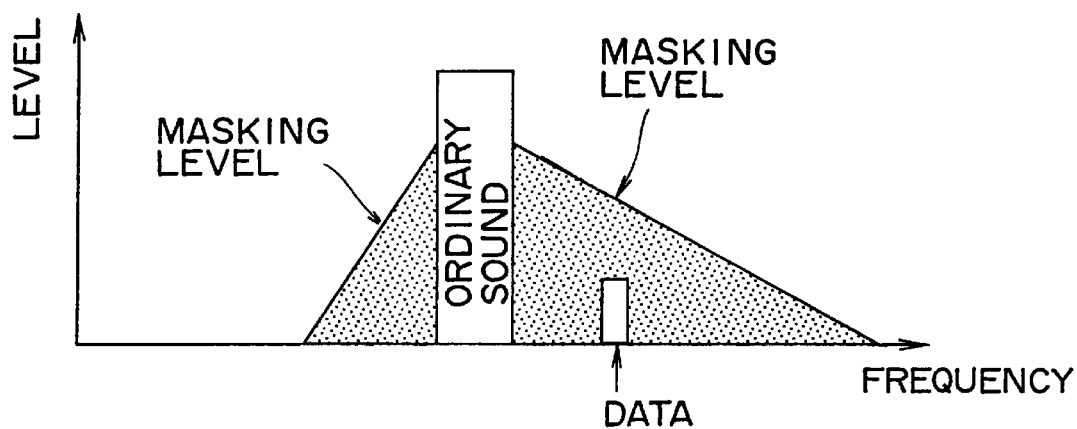
F I G. 18
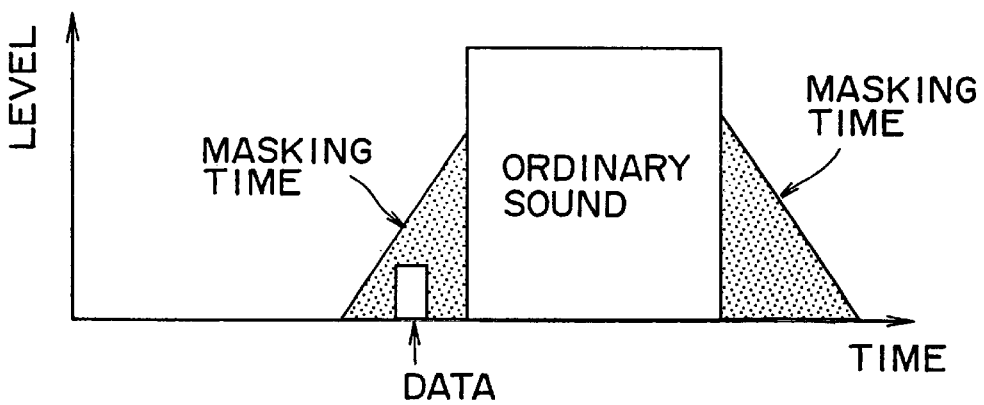

DATA TRANSMISSION AND RECEPTION METHODS AND DATA TRANSMISSION AND RECEPTION APPARATUS

BACKGROUND OF THE INVENTION

This invention relates to a data transmission method and a data transmission apparatus by which an audio information signal is transmitted with a new data signal superposed thereon and a data reception method and a data reception apparatus by which an audio information signal with a new data signal superposed thereon is received and demodulated.

When it is tried to perform timer reservation of a program on a conventional television set, a video tape recorder (VTR) or a like apparatus, a channel name, a reservation date, a reservation time and so forth are set first, and then an execution button is operated. Alternatively, a code determined so as to designate a program is inputted and an execution key is operated to effect timer reservation.

In order to eliminate such a complicated procedure for reservation operation, it is a possible idea to transmit program information in a superposed relationship together with a video signal or an audio signal so as to be used for a reservation procedure. Where such information to be noticed by users is sent, there is a problem in that it is required to send data and cause a receiving apparatus to generate chimes or musical sound separately.

Further, where data are superposed on an audio signal, since the frequency of the audio signal is in a voice band which can be recognized by users, there is another problem in that the sound reproduced based on the audio signal sounds disagreeable to a user because of sound arising from the data superposed on the audio signal.

While it is possible to send a video signal with data superposed thereon, in this instance, the data may possibly be interposed in a horizontal retrace line interval or a vertical retrace line interval of a vertical blanking interval or the like. However, while such interposition of data allows superposition of the data without having any bad influence on a video signal or an audio signal, this requires the supplier side of a source such as a broadcasting station or a repeating station for provision of an apparatus called inserter which is comparatively complicated and expensive.

Further, where data are superposed on a video signal, since the frequency band of the video signal is broad, an excessively high transmission capacity is required, and effective utilization of a transmission line cannot sometimes be anticipated in that the efficiency with regard to data is deteriorated and so forth.

SUMMARY OF THE INVENTION

It is an object of the present invention to provide a data transmission method and a data transmission apparatus as well as a data reception method and a data reception apparatus wherein data can be superposed on an audio information signal without making sound disagreeable when the audio information signal is reproduced.

It is another object of the present invention to provide a data transmission method and a data transmission apparatus as well as a data reception method and a data reception apparatus wherein a reservation procedure can be performed simply.

In order to attain the objects described above, according to an aspect of the present invention, there is provided a data transmission method for transmitting an audio information signal with a new data signal superposed thereon, comprising the steps of phase modulating the audio information signal phase with the data signal, and transmitting the audio information signal prior to the phase modulation and the phase modulated audio information signal by first and second channels which are included in a band for transmission of voice, respectively.

The audio information signal may be phase modulated with the data signal such that, at a delineating point of sound of the audio information signal, the phase of the sound is shifted, or may be phase modulated with the data signal at a portion of the audio information signal which represents fixed sound in a predetermined period which makes a unit of repetition.

Preferably, the sound information to be transmitted by the first channel and the second channel is shifted by predetermined phase amounts after each period of a synchronizing signal, and the audio information signal to be transmitted by the second channel is further phase modulated with the data signal which is synchronized with the synchronizing signal.

According to another aspect of the present invention, there is provided a data reception method for receiving a signal including sn audio information signal on which a new data signal is superposed, comprising the steps of receiving the audio information signal and a modulated audio information signal, which includes the audio information signal phase modulated with the data signal, in a voice band, and demodulating the modulated audio information signal phase modulated with the data signal using the received audio information signal as a reference signal to demodulate the data signal.

According to a further aspect of the present invention, there is provided a data transmission apparatus for transmitting an audio information signal with a new data signal superposed thereon, comprising phase modulation means for phase modulating the audio information signal with the data signal, and addition means for adding the phase modulated audio information signal outputted from the phase modulation means and the audio information signal which is not in a phase modulated condition and transmitting the signal obtained by the addition.

The phase modulation means phase may modulate the audio information signal with the data signal such that, at a delineating point of sound of the audio information signal, the phase of the sound is shifted, or may modulate the audio information signal with the data signal at a portion of the audio information signal which represents fixed sound in a predetermined period which makes a unit of repetition.

Preferably, the phase modulation means includes first phase modulation means for phase shifting the audio information signal, which is to be transmitted without being phase modulated, by a predetermined phase amount in synchronism with a synchronizing signal, second phase modulation means for phase modulating the audio information signal with the data signal which is synchronized with the synchronizing signal, and third modulation means for phase shifting the modulated audio information signal outputted from the second phase modulation means by a predetermined phase amount in synchronism with the synchronizing signal.

According to a still further aspect of the present invention, there is provided a data reception apparatus for receiving a signal including an audio information signal on which a new data signal is superposed, comprising reception means for receiving the audio information signal and a modulated audio information signal, which includes the audio information signal phase modulated with the data signal, in a band allocated to voice, and demodulation means for demodulating the modulated audio information signal phase modulated with the data signal using the audio information signal received by the reception means as a reference signal.

The demodulation means may detect whether or not the audio information signal and the modulated audio information signal phase modulated with the data signal are coincident with each other to demodulate the data signal.

Further, the data reception apparatus may further comprise processing means for processing the data signal demodulated by the demodulation means to allow the demodulated data signal to be displayed on a display unit.

According to a yet further aspect of the present invention, there is provided a data transmission method, comprising the steps of superposing a new data signal on a frequency-level region or a time-level region of an audio information signal which is masked with a voice band, and transmitting the resulting signal.

With the data transmission method and apparatus and the data reception method and apparatus, since they are constructed in such a manner as described above, they can be applied to media which handle sound information and communication media. In the data transmission method and apparatus and the data reception method and apparatus, since an audio information signal is phase modulated and sent together with a data signal where, on the reception side, the data signal is demodulated using the audio information signal, which has been transmitted without being modulated, as a reference signal, the data signal can be transmitted and demodulated by apparatus having simple constructions.

Where the phase modulation of the the audio information signal is performed at a delineating point of sound of the audio information signal with the data signal, when sound of the phase modulated sound information is listened to, it does not sound as disagreeable sound. Meanwhile, where the audio information signal is phase modulated with the data signal at a portion thereof in which sound does not vary in a predetermined period but varies after each predetermined period like musical sound or sound of chimes, sound of the phase modulated sound information is less liable to sound as disagreeable sound.

Furthermore, where audio information signals of the first channel and the second channel are phase shifted by predetermined phase amounts in synchronism with a synchronizing signal and the audio information signal of the second channel is further phase modulated in accordance with the data signal synchronized with the synchronizing signal, since the phases of the two channels change at the same point of time, when sounds of the two channels are listened to, they do not sound disagreeable.

Also where a data signal is superposed on a frequency-level region or a time-level region which is masked with an audio information signal, when sound of the audio information signal on which the data signal is superposed is listened to, the sound does not sound as disagreeable sound, and the data signal can be demodulated by an apparatus of a simple construction.

By the way, where information of a broadcasting program is sent together with a data signal in the present invention and the data signal is demodulated to extract the program information on the reception side, timer reservation can be performed by an apparatus of a simple construction.

Further, since musical sound or sound of chimes can be superposed on the data signal, when a display is provided based on the data signal, musical sound or sound of chimes for attracting attention of a user to the display screen need not be generated separately, but it is possible to attract attention of a user to the display screen by generating sound in accordance with the audio information signal, which is suitable for timer reservation.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 17 is a diagram illustrating a different form of a data transmission method to which the present invention is applied; and FIG. 18 is a similar view but illustrating a modification to the transmission method illustrated in FIG. 17.

DESCRIPTION OF THE PREFERRED EMBODIMENTS

Figure 1:
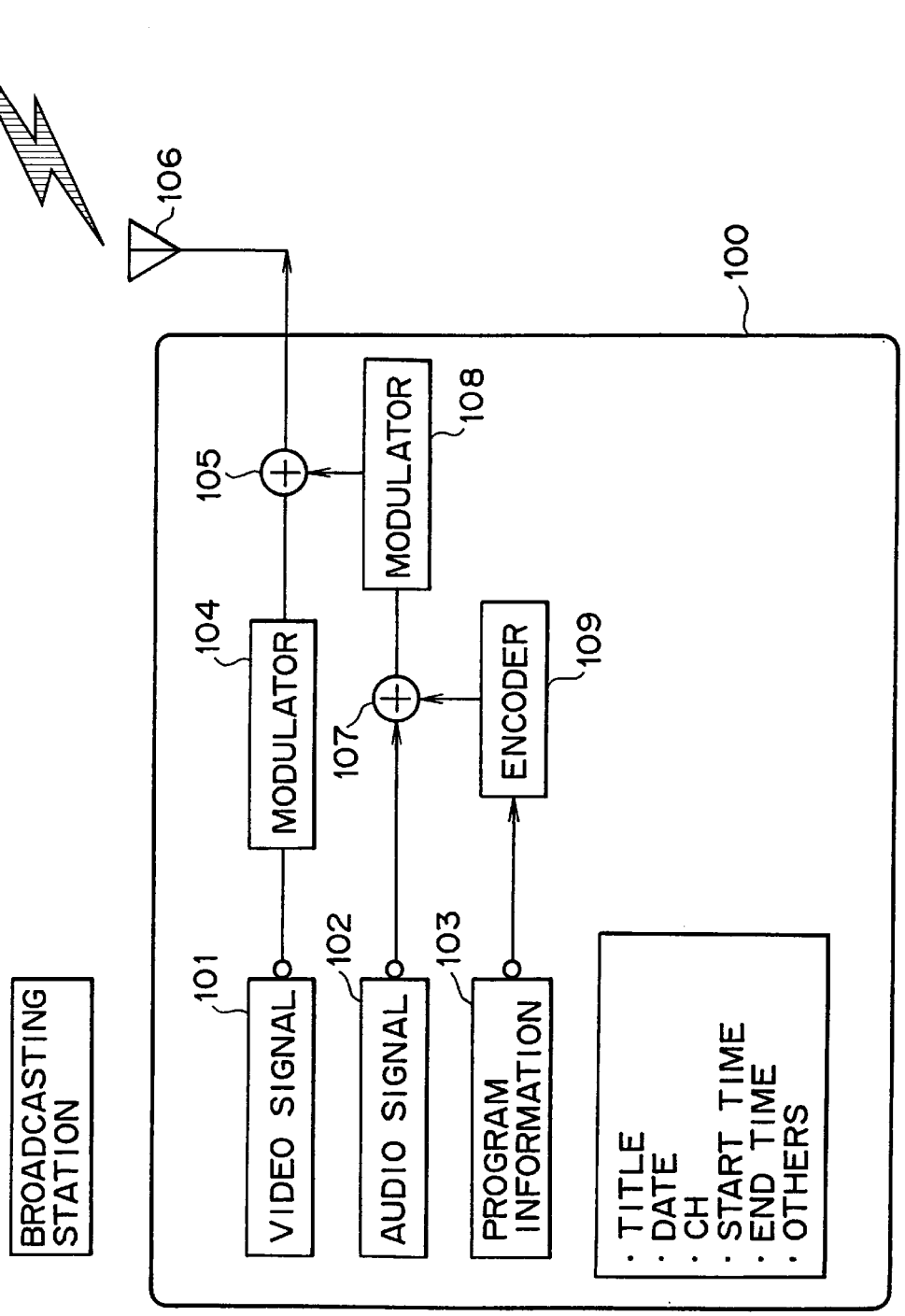
FIG. 1 is a block diagram showing an example of a construction of a data transmission apparatus of a broadcasting station to which the present invention is applied.

Referring first to FIG. 1, there is shown a construction of a data transmission apparatus of a broadcasting station of the present invention to which a data transmission method of the present invention is applied. It is to be noted that the construction of the data transmission apparatus of the broadcasting station shown in FIG. 1 is a mere example of a data transmission apparatus of the present invention, and the present invention is not limited to the data transmission apparatus of the broadcasting station as hereinafter described.

The data transmission apparatus of the broadcasting station is shown as a transmission section 100 of a broadcasting station for television broadcasting. In the transmission section 100, a video signal reproduced from a video tape or sent from a video camera is supplied from a video signal supply section 101 to a video modulator 104, by which predetermined modulation is performed for a video carrier with the video signal to make a modulated video signal of a video frequency band.

Meanwhile, an audio information signal relating to the video signal is supplied from an audio signal supply section 102 to an addition modulation section 107, by which it is addition modulated so that a data signal outputted from an encoder 109 is superposed on the audio information signal. An output of the addition modulation section 107 is supplied to an audio modulator 108, by which predetermined modulation is performed for an audio carrier with the output of the addition modulation section 107. Consequently, a modulated audio information signal of an audio frequency band is obtained from the audio modulator 108.

The modulated video signal and the modulated audio information signal which have different frequency bands from each other are added by an addition section 105 and broadcast from an antenna 106.

It is to be noted that a signal to be encoded by the encoder 109 is program information generated by a program information generation section 103. The program information includes a title of a program, a broadcasting date of the program, a broadcasting channel of the program, a broadcasting start time of the program, a broadcasting end time of the program and other information regarding the program.

Accordingly, while radio waves broadcast from the broadcasting station shown in FIG. 1 naturally include picture and sound information of a program, they additionally include program information superposed on the audio information signal. Therefore, if each user receives such broadcast using an antenna and demodulates the received broadcast, then the program information can be utilized on the reception side.

Figure 2:
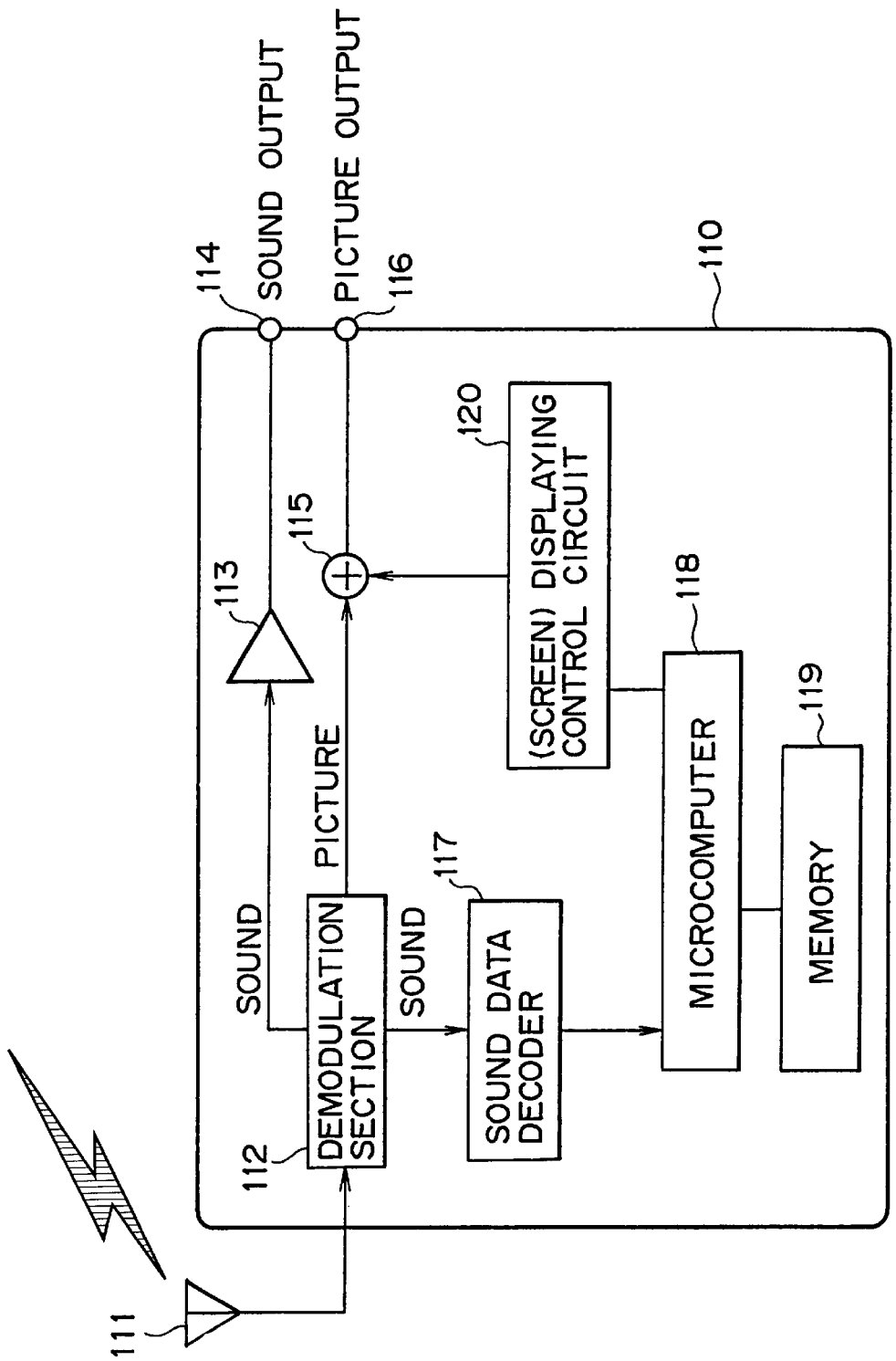
FIG. 2 is a block diagram showing an example of a construction of a reception section of a data reception apparatus to which the present invention is applied.

Referring now to FIG. 2, there is shown a construction of part of a data reception apparatus of the present invention to which a data reception method of the present invention is applied. FIG. 2 shows only a construction of a reception section 110 which can receive a broadcast including program information. The reception section 110 shown may be more particularly a television set, a video tape recorder, an audio apparatus, a radio or some other apparatus. A broadcasting signal received by an antenna 111 provided for the reception section 110 is supplied to a demodulation section 112, by which it is separated into an audio information signal and a video signal which form the broadcasting signal. The audio information signal and the video signal thus separated are outputted separately from the demodulation section 112. The audio information signal outputted from the demodulation section 112 is amplified by an amplifier 113 and outputted as an audio output 114 from the reception section 110. Meanwhile, the video signal outputted from the demodulation section 112 is added by an addition section 115 to program picture information for displaying program information outputted from a display control circuit 120 to produce a picture output 116.

Further, the demodulated audio information signal is supplied from the demodulation section 112 to an audio data decoder 117, by which the program information superposed on the audio information signal is demodulated. The thus demodulated program information is processed by various processes such as control and storage so that it may be displayed on a display unit of a microcomputer 118 which includes a memory 119. The thus processed demodulated program information is supplied to the addition section 115 through the (screen) display control circuit 120.

Consequently, where a broadcasting signal is broadcast with program information superposed thereon and a data reception apparatus is, for example, a television set, the program information is displayed on a screen of the television set. Then, a user can observe the program information thus displayed and perform reservation of the program and so forth as hereinafter described. It is to be noted that, when program information is to be displayed, it is preferably to generate alarm sound such as chimes or musical sound so that the user may take notice of the screen. The alarm sound may be transmitted as an audio information signal.

Figure 3:
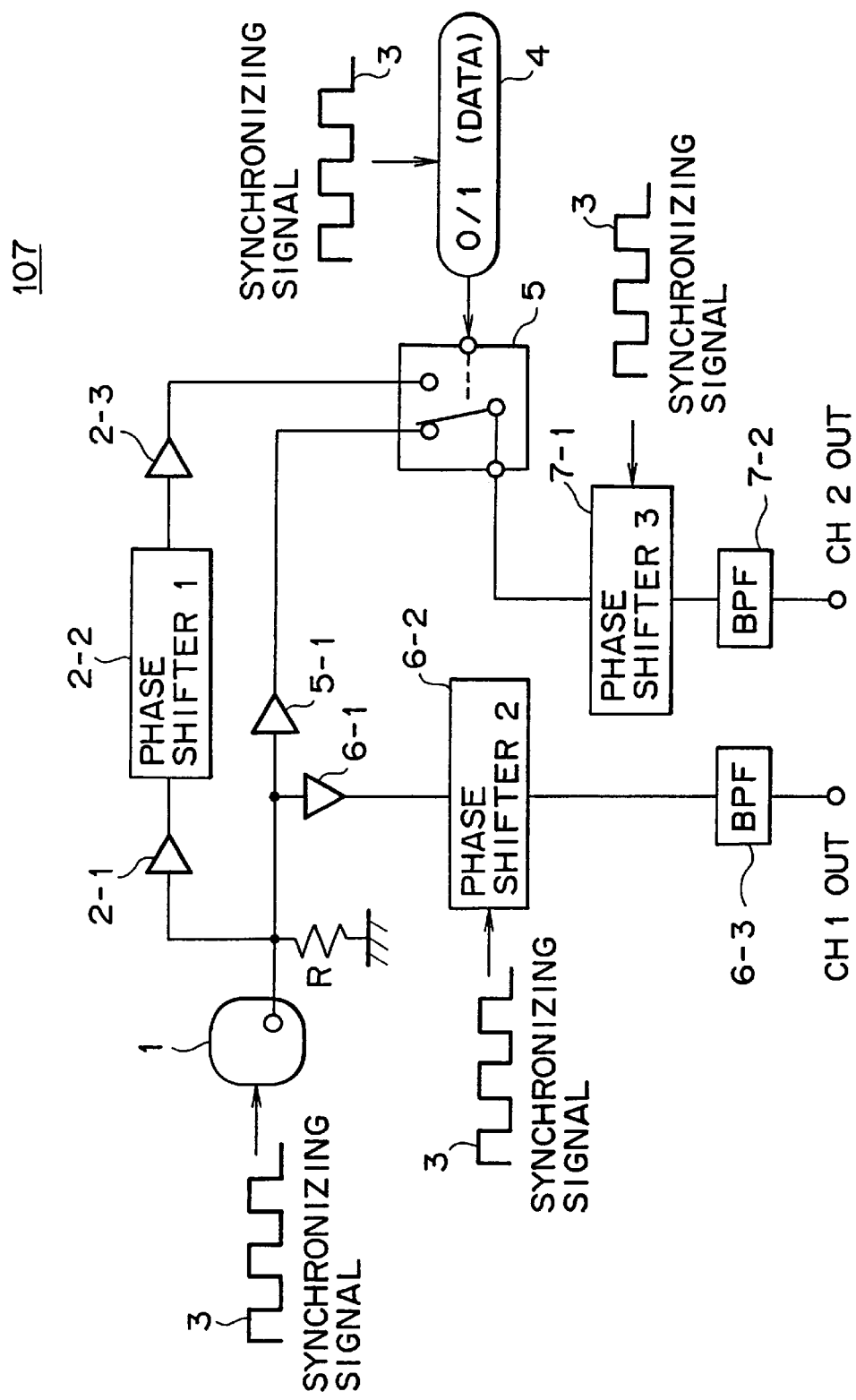
FIG. 3 is a circuit diagram showing an example of a construction of an addition modulation section of the data transmission apparatus of FIG. 1.

Referring now to FIG. 3, there is shown an example of a construction of the addition modulation section 107 shown in FIG. 1. The addition modulation section 107 shown includes a carrier signal generator 1 which generates sn audio information signal such as chimes or musical sound. The carrier signal generator 1 generates a carrier signal having a variable frequency so as to allow generation of an alarm sound such as chimes or music sound. The carrier signal outputted from the carrier signal generator 1 is terminated at a matching resistor R and branched into three branch signals. The first branch signal is supplied through a buffer 2-1 to a first phase shifter 2-2, by which it is phase shifted by 180 degrees, and then supplied through another buffer 2-3 to a first selection input terminal of a selection circuit 5. The second branch signal is inputted to a second selection input terminal of the selection circuit 5 through a buffer 5-1. The third branch signal is supplied through a buffer 6-1 to a second phase shifter 6-2, by which it is phase shifted by a predetermined amount at each predetermined timing, and then supplied to a band-pass filter (BPF) 6-3, by which signal components of unnecessary bands are removed therefrom. Then, an output of the band-pass filter 6-3 is outputted as an output signal (CH1 out) of the first channel.

Figure 4:
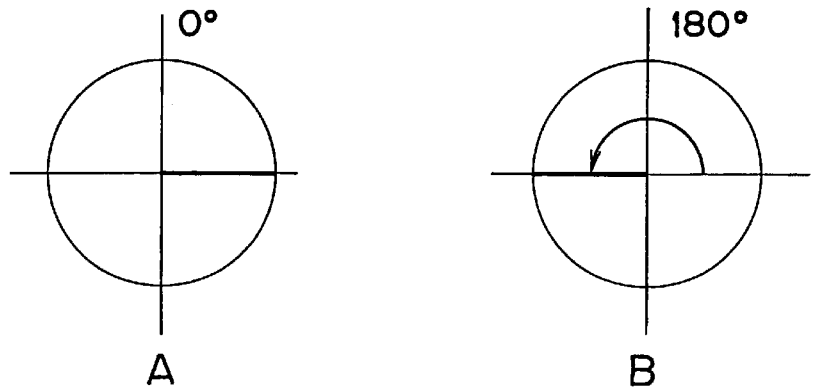
FIG. 4 is a diagrammatic view illustrating a phase shift amount of a phase shifter in the addition modulation section of FIG. 3.

A data 4 such as program information is applied as a selection signal to the selection circuit 5. For example, when the data 4 is "0", a signal inputted to the second selection input terminal of the selection circuit 5 is selectively outputted, but when the data 4 is "1", another signal inputted to the first selection input terminal of the selection circuit 5 is selectively outputted, from the selection circuit 5. In particular, when the data 4 is "0", a carrier signal inputted to the second selection input terminal and having a phase not shifted as seen in A of FIG. 4 is outputted from the selection circuit 5, but when the data 4 is "1", another carrier signal inputted to the first selection input terminal and having a phase shifted by 180 degrees as seen in B of FIG. 4 is outputted. In this manner, the carrier signal is phase modulated with the data 4 by the selection circuit 5.

The carrier signal phase modulated with the data 4 and outputted from the selection circuit 5 is further phase shifted by a predetermined amount at each predetermined timing by a third phase shifter 7-1, and then signal components of unnecessary bands are removed from the carrier signal by a band-pass filter (BPF) 7-2. Thus, an output of the band-pass filter 7-2 is outputted as an output signal (CH2 out) of the second channel.

It is to be noted that a synchronizing signal 3 is applied to the carrier signal generator 1 and a carrier signal synchronized with the synchronizing signal 3 is outputted from the carrier signal generator 1, and the same synchronizing signal 3 is applied also to the second phase shifter 6-2 and the third phase shifter 7-1, whereupon the second phase shifter 6-2 and the third phase shifter 7-1 provide predetermined phase shift amounts to input signals thereto at the timing of the synchronizing signal 3. Also the data 4 such as program information is synchronized with the synchronizing signal 3.

Figure 5:
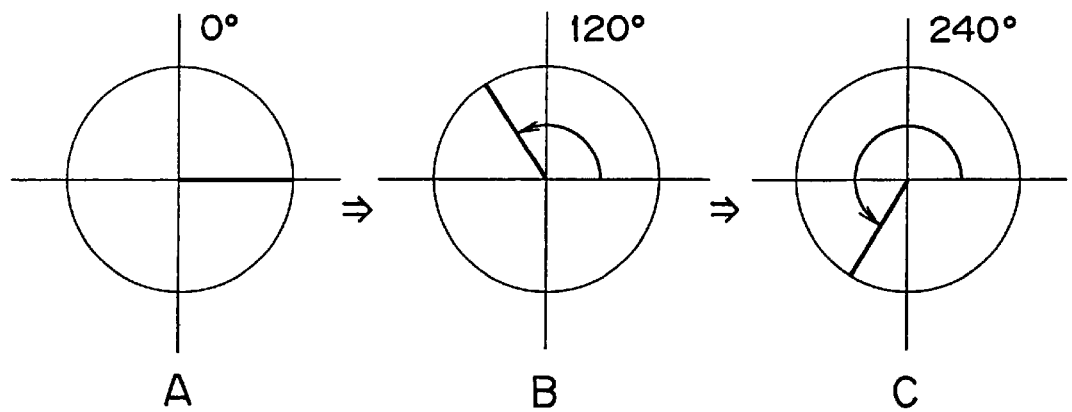
FIG. 5 is a diagrammatic view illustrating a variation of the phase shift amount of another phase shifter in the addition modulation section of FIG. 3.

The second phase shifter 6-2 and the third phase shifter 7-1 have a same construction and each successively shifts the phase of a signal inputted thereto in such a manner as seen, for example, in FIG. 5 at each timing of a period of the synchronizing signal 3. In particular, a signal having a phase not shifted as seen in A of FIG. 5 is shifted by 120 degrees in phase as seen from B of FIG. 5 at a timing of the synchronizing signal 3. Then, at a next timing of the synchronizing signal 3, the signal is further shifted by 120 degrees in phase and consequently exhibits a phase shift by 240 degrees from the initial phase as seen from C of FIG. 5. At another next timing of the synchronizing signal 3, the signal is further shifted by 120 degrees in phase and consequently exhibits a phase shift of 360 degrees from the initial phase and therefore exhibits the phase amount of 0 degree as seen from A of FIG. 5.

In this manner, an inputted signal is successively shifted by 120 degrees at each timing of the synchronizing signal 3, and consequently, the phase of a signal outputted from each of the second phase shifter 6-2 and the third phase shifter 7-1 is successively shifted to 0°→120°→240°→0°→ . . . . Since the second phase shifter (phase shifter 2) 6-2 and the third phase shifter (phase shifter 3) 7-1 are provided for the channel CH1 and the channel CH2, respectively, and perform phase shifting in a similar manner to each other, when sounds of the channel CH2 and the channel CH2 are listened to, even though they are phase modulated with the data 4, they sound not as disagreeable sounds. It is to be noted that, for example, an audio information signal of the left channel is outputted from the channel CH1 while an audio information signal of the right channel is outputted from the channel CH2. Further, the phase shift amount by which phase shifting is performed at each timing of the synchronizing signal 3 by the second phase shifter 6-2 and the third phase shifter 7-1 is not limited to 120 degrees, but may be an arbitrary value.

Further, the reason why two channels are used is it is intended to use a carrier signal of the channel CH1 as a reference signal when a carrier signal phase shifted by the data 4 of the channel is demodulated.

Figure 6:
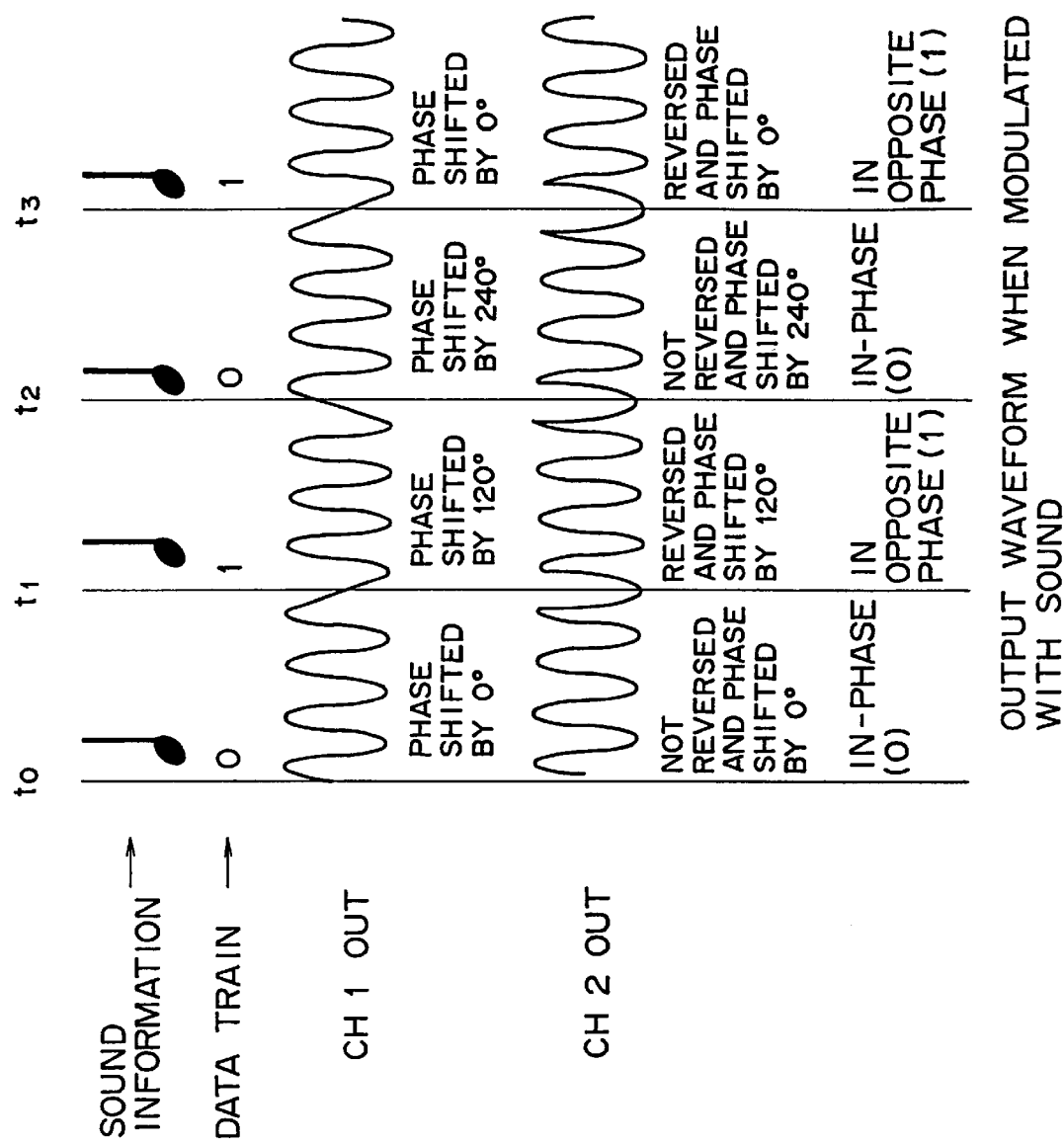
FIGS. 6A to 6D are waveform diagrams illustrating output waveforms of the addition modulation section of FIG. 3 when sound is phase modulated with a data signal.

Referring now to FIGS. 6A to 6D, there are shown phases of the carrier signals outputted from the channel CH1 and the channel CH2 where the audio information signal is sound information such as chimes or music sound. FIG. 6A illustrates sound information generated from the audio signal supply section 102 and indicates transition timings of the sound information at t0, t1, t2, t3, . . . . FIG. 6B illustrates a data train encoded by the encoder 109 from program information generated from the program information generation section 103 shown in FIG. 1. The data train is, for example, "0, 1, 0, 1, . . . ". In this instance, the first channel output (CH1 out) outputted from the addition modulation section 107 whose detailed construction is shown in FIG. 3 has such a waveform as shown in FIG. 6C. Referring to FIG. 6C, the phase of the carrier signal is shifted by 0 degree at the timing t0, by 120 degrees at the next timing t1, by 240 degrees at the further next timing t2, and by 0 degree at the still further next timing t3. Thereafter, a similar phase shifting sequence is repeated.

It is to be noted that each of the timings t0, t1, t2, t3, . . . comes after each fixed period of time, and the period is a unit time length of the sound information. Since the timings are transition timings of the sound information as described above, if phase modulation is performed at the timings with the data train, then even if such phase modulated sound is listened to, the phase shift cannot be perceived readily, and consequently, the sound does not sound disagreeable.

Meanwhile, the second channel output (CH2 out) outputted from the addition modulation section 107 has such a waveform as shown in FIG. 6D. In particular, referring to FIG. 6D, at the timing t0, since the data train exhibits "0" and phase shifting is not performed, the phase of the carrier signal is not reversed and is shifted by 0 degree. At the next timing t1, since the data train exhibits "1" and phase shifting by 180 degrees is performed, the phase of the carrier signal is reversed and shifted by 120 degrees. At the further next timing t2, since the data train exhibits "0" and phase shifting is not performed, the phase of the carrier signal is not reversed and is shifted by 240 degrees. At the still further next timing t3, since the data train exhibits "1" and phase shifting by 180 degrees is performed, the phase of the carrier signal is reversed and shifted by 0 degree. Thereafter, a similar sequence of phase variations is repeated in accordance with 1/0 of the data train.

As a result, as seen from FIGS. 6A to 6D, when the data train exhibits "0", the carrier signals outputted from the first channel and the second channel have a same phase, but when the data train exhibits "1", the carrier signal outputted from the second channel exhibits a phase opposite to the phase of the carrier signal outputted from the first channel.

Thus, when the data 4 superposed on the audio information signal is to be demodulated by the reception section 110, the phases of the carrier signal of the first channel and the carrier signal of the second channel are compared with each other. A detailed construction of the audio data decoder 117 provided in the reception section 110 is shown in FIG. 7.

Figure 7:
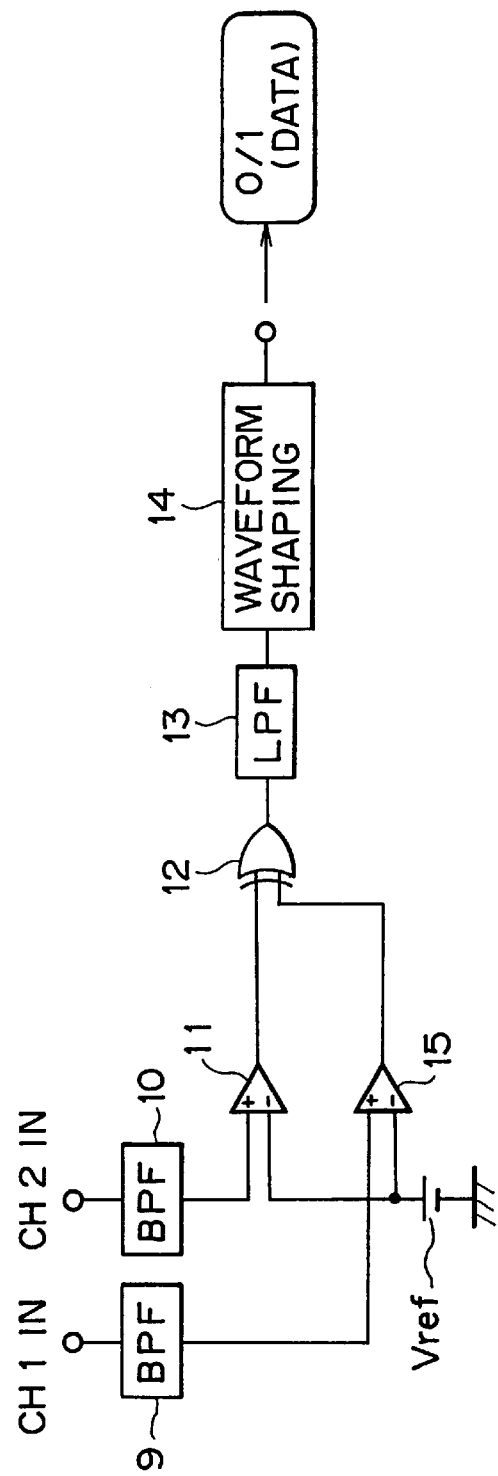
FIG. 7 is a block diagram showing a construction of an audio data decoder of the data reception apparatus of FIG. 2.

Referring to FIG. 7, in the audio data decoder 117 shown, a signal of the first channel of an audio information signal separated by the demodulation section 112 is inputted to a band-pass filter 9, by which unnecessary band components are removed from the first channel signal, and then to a second comparator 15, by which it is waveform shaped so that it has a pulse waveform. Meanwhile, a signal of the second channel of the audio information signal separated by the demodulation section 112 is inputted to a band-pass filter 10, by which unnecessary band components are removed from the second channel signal, and then to a first comparator 11, by which it is waveform shaped so that it has a pulse waveform. A reference voltage Vref is supplied to the first comparator 11 and the second comparator 15, and each of the first comparator 11 and the second comparator 15 outputs a pulse which exhibits a high level when the level of the signal inputted thereto exceeds the reference voltage Vref.

The first channel signal outputted from the first comparator 11 and having a pulse waveform and the second channel signal outputted from the second comparator 15 and having a pulse waveform are inputted to an exclusive OR circuit (EXOR) 12, by which it is detected whether the first channel signal and the second channel signal are coincident or incoincident with each other. If the signals of the two channels are coincident with each other, then "0" is outputted from the exclusive OR circuit 12, but if the signals of the two channels are incoincident with each other, then "1" is outputted from the exclusive OR circuit 12.

In other words, if the carrier signal of the channel 2 has a phase reserved with the data 4, then the exclusive OR circuit 12 detects incoincidence and outputs "1". The output of the exclusive OR circuit 12 is supplied to a low-pass filter (LPF) 13, by which unnecessary band components are removed from the same, and then to a waveform shaping circuit 14, by which it is waveform shaped so that it has a waveform of a pulse at a timing synchronized with the synchronizing signal. The signal of the pulse waveform makes a demodulation data output of 0/1 of the audio data decoder 117.

By such measures as described above, data of program information or the like transmitted in a superposed relationship on an audio information signal from the transmission section 100 can be demodulated using a signal of the first channel and another signal of the second channel by the reception section 110. The demodulated data of the program information or the like are processed by the microcomputer 118 including the memory 119 shown in FIG. 2 so that they may be displayed by a display unit, and are supplied to the addition section 115 through the display control circuit 120. Then, the program information superposed on the broadcasting signal is displayed on a television set or a like display unit.

Figure 8:
FIG. 8 is a diagrammatic view illustrating a signal structure of a data signal to be superposed on an audio information signal by the data transmission apparatus of FIG. 1.

An example of a signal structure of data superposed on an audio information signal is illustrated in FIG. 8. In the signal structure example illustrated in FIG. 8, in order to allow distinction of the data signal from another signal superposed on the audio information signal, a header area is added to a data area and a header representing that the data involved are program information is placed in the header area. Alternatively, the carrier itself generated from the carrier signal generator 1 may have a header.

Thus, while watching an image on which program information included in a broadcasting signal is displayed, a user can perform reservation of the program or the like as hereinafter described. It is to be noted that program information is displayed on a display screen only when such program information is superposed on a broadcasting signal, and preferably, alarm sound such as chimes or musical sound is developed so that the user may take notice of the screen. The alarm sound may be transmitted as an audio information signal by an audio channel.

Thus, a method of reserving a program is described taking display screens shown in FIGS. 9A to 9C and 10A to 10C when program information is superposed on a broadcasting signal as an example.

Figure 9A:
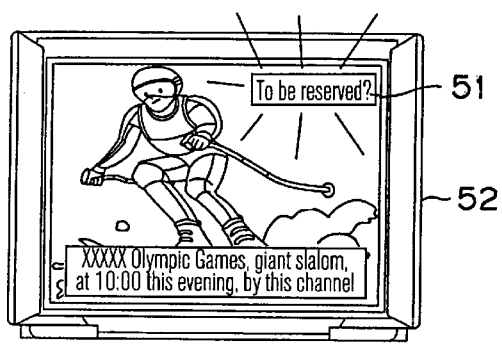
FIGS. 9A to 9C are schematic views illustrating a method wherein receiving reservation of a program is performed for a television set on a television screen when program information is superposed on a broadcasting signal in accordance with the present invention.
Figure 9B:
Figure 9C:
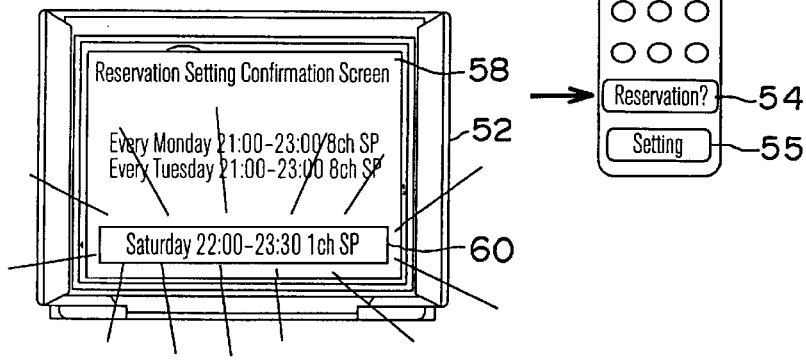

FIGS. 9A to 9C illustrate a procedure when reception reservation of a program to be displayed on a television set is performed. If data of program information superposed on an audio information signal is decoded and it is confirmed that the data is valid, then characters of "To be reserved?" (51) are displayed blinking and characters "xxxxx Olympic Games, giant slalom, at 10:00 this evening, by this channel" are displayed on the screen of a television set 52 as seen in FIG. 9A. Such display control of the screen is performed by the microcomputer 118 and the display control circuit 120 in the reception section 110. Further, when the image is displayed, the audio information signal on which the program information is superposed provides sound of chimes or some symbolic musical sound so that a user may pay attention to the screen. If the user watches the image and wants to effect reception reservation of the program displayed on the screen, the user sill manually operate a reservation button 54 provided on a remote controller 53 for remotely controlling the television set.

Consequently, the character information displayed on the television set 52 is changed to "Saturday 22:00–23:30 1ch SP should be reserved?", and the new character information is displayed in blinking to urge the user to effect a confirmation operation as seen in FIG. 9B. Also this display control of the screen is performed by the microcomputer 118 and the display control circuit 120 in the reception section 110. The user will observe the image and manually operate, when to confirm the reception reservation, a setting button 55 of the remote controller 53. Consequently, the screen display of the television set 52 changes to a reservation setting confirmation image 58 as seen in FIG. 9C, in which "Every Monday 21:00–22:00 8ch SP" and "Every Tuesday 21:00–23:00 8ch SP" are displayed and "Saturday 22:00–23:30 1ch SP" (60) is displayed in blinking on the screen. The former two programs displayed are programs reserved for reception already, and only the last program reserved for reception newly is displayed in blinking. Also this display control of the screen is performed by the microcomputer 118 and the display control circuit 120 in the reception section 110.

Timer reception reservation of a program to be displayed on a television set is performed by such a procedure as described above. Now, a procedure when a program to be recorded by a video tape recorder (VTR) is reserved for recording is described with reference to FIGS. 10A to 10C.

Figure 10A:
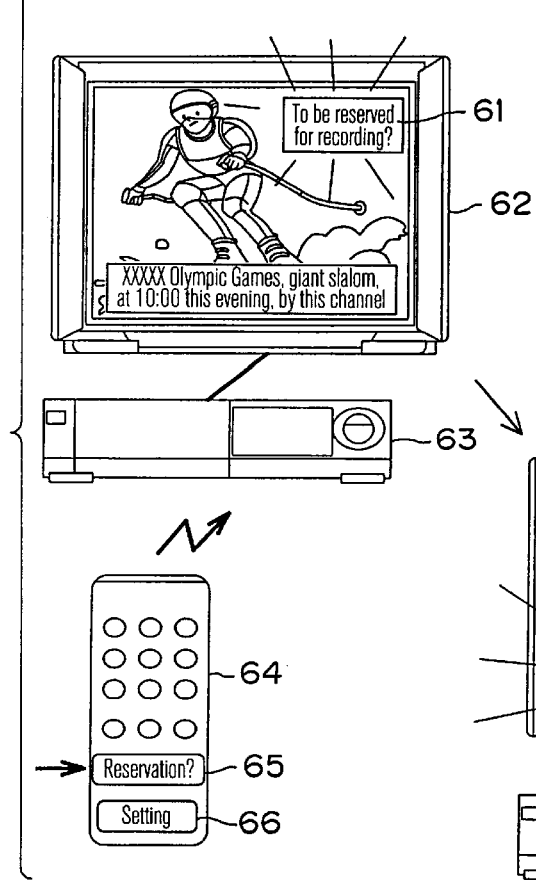
FIGS. 10A to 10C are schematic views illustrating a method wherein recording reservation of a program is performed for a video tape recorder on a television screen when program information is superposed on a broadcasting signal in accordance with the present invention.

If data of program information superposed on an audio information signal is decoded and it is confirmed that the data is valid, then characters of "To be reserved for recording?" (61) are displayed blinking and characters "xxxxx Olympic Games, giant slalom, at 10:00 this evening, by this channel" are displayed on the screen of a television set 62 as seen in FIG. 10A. Such display control of the screen is performed by the microcomputer 118 and the display control circuit 120 in the reception section 110. Further, when the image is displayed, the audio information signal on which the program information is superposed provides sound of chimes or some symbolic musical sound so that the user may pay attention to the screen. If the user watches the image and wants to effect reservation of the program displayed on the screen for recording by a video tape recorder 63, the user will manually operate a recording reservation button 65 provided on a remote controller 64 for remotely controlling the video tape recorder 63.

Figure 10B:
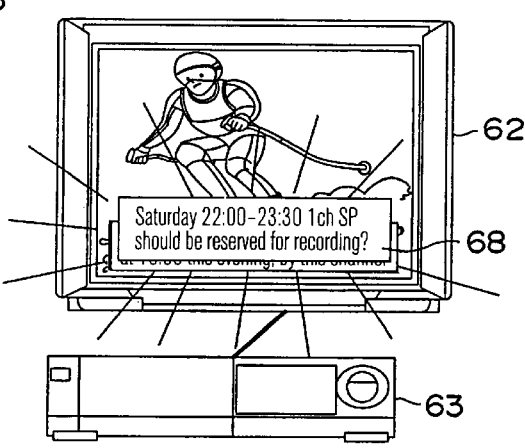
Figure 10C:
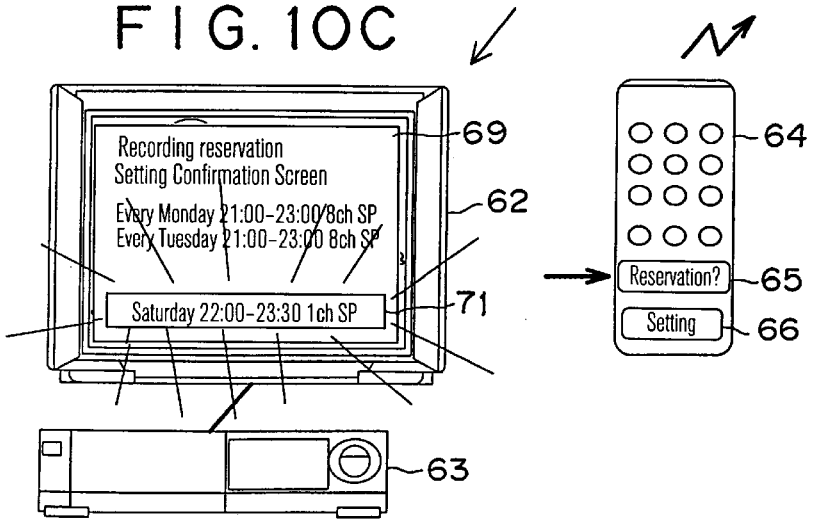

Consequently, the character information displayed on the television set 62 is changed to "Saturday 22:00–23:30 1ch SP should be reserved for recording?" (68), and the new character information is displayed in blinking as seen in FIG. 10B. Also this display control of the screen is performed by the microcomputer 118 and the display control circuit 120 in the reception section 110. The user will observe the blinking image display and come to know that it is urged to effect confirmation of the recording reservation. Then, when to confirm the recording reservation, the user will manually operate the setting button 66 of the remote controller 64. Consequently, the screen display of the television set 62 changes to a recording reservation setting confirmation image 69 as seen in FIG. 10C, in which "Every Monday 21:00–22:00 8ch SP" and "Every Tuesday 21:00–23:00 8ch SP" are displayed and "Saturday 22:00–23:30 1ch SP" is displayed in blinking on the screen. The former two programs displayed are programs reserved for recording already, and only the last program reserved for recording newly is displayed in blinking. Also this display control of the screen is performed by the microcomputer 118 and the display control circuit 120 in the reception section 110.

Figure 11:
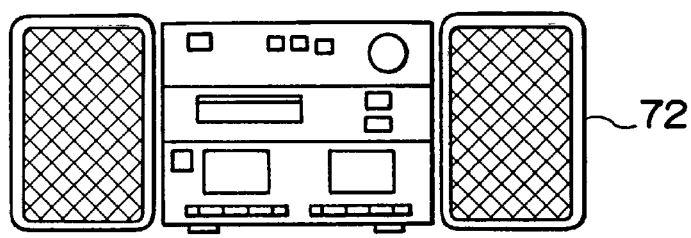
FIG. 11 is a schematic view showing an audio apparatus for which a program to be received or a program to be recorded is timer reserved in accordance with the present invention.

Timer recording reservation of a program to be recorded by the video tape recorder 63 is performed by such a procedure as described above. Thus, where the data transmission apparatus of the present invention is applied to a broadcasting station and the data reception apparatus of the present invention is provided in a reception apparatus such as a television set or a video tape recorder, timer reservation not only for television sets and video tape recorders but also for various electronic apparatus can be performed by simple operations. For example, in such an audio apparatus 72 as shown in FIG. 11, timer reservation of a program to be received or recorded can be performed by a similar procedure to that described above. In this instance, for the display unit, a display device on a control panel attached to the audio apparatus 72 may be used.

Figure 12:
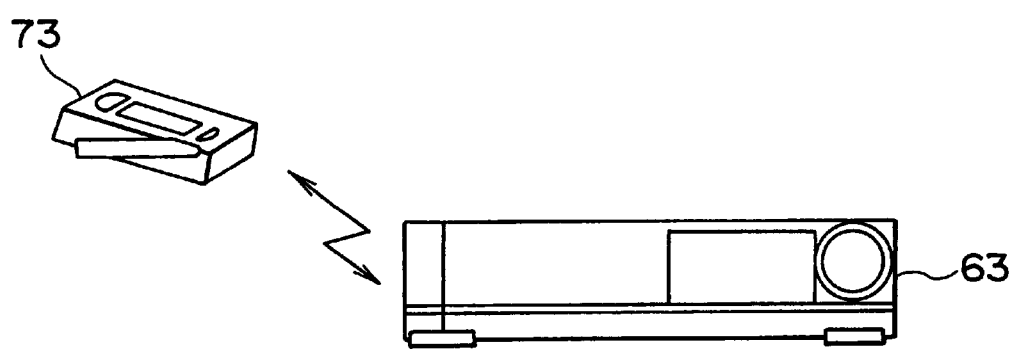
FIG. 12 is a schematic view illustrating storage of program information into a non-contact memory of a video tape in accordance with the present invention.

FIG. 12 illustrates a manner wherein program information obtained by a reservation procedure of the video tape recorder 63 described above is stored into a memory of the non-contact type provided in a video tape cassette 73 for the video tape recorder 63. As means for transmitting a program information signal to the memory in this instance, short distance transmission means may be used. It is to noted that a reader/writer corresponding to the memory is contained in the video tape recorder 63. Further, not a contactless type memory but an ordinary memory may be provided in the video tape cassette 73. Further, for a recording medium for storing program information, not only a tape, but also various recording media may be used.

Figure 13:
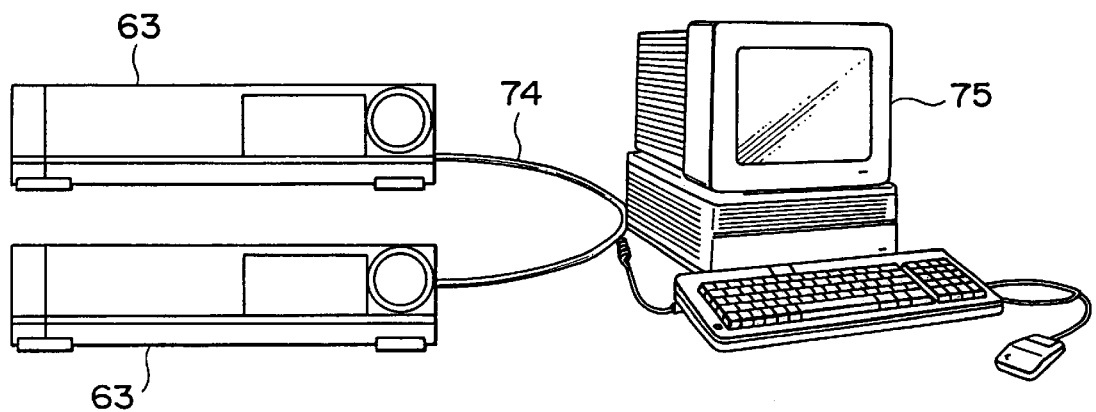
FIG. 13 is a schematic view illustrating storage of program information into a data base of a computer in accordance with the present invention.

Further, FIG. 13 illustrates a manner wherein program information obtained by a reservation procedure of the video tape recorder 63 described above is fetched into a data base of a computer 75. In this instance, an audio output terminal of the video tape recorder 63 and, for example, a serial port of the computer 75 are connected to each other by a cable 74 so that program information of the video tape recorder 63 may be transmitted to the computer 75. The computer 75 fetches the program information into a data base, which is used for retrieval or arrangement of information. Further, automatic control or management of reception, recording or the like of an electronic apparatus such as a television set or a video tape recorder may be performed by the computer 75 using the program information fetched by the computer 75.

Figure 14:
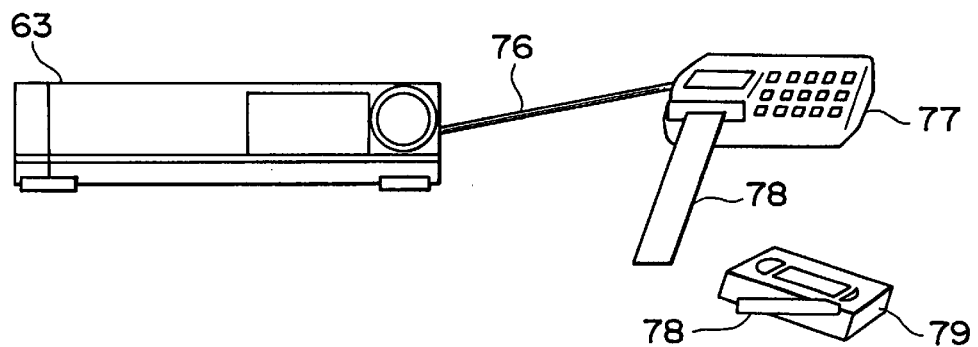
FIG. 14 is a schematic view illustrating printing of program information using a printer in accordance with the present invention.

Furthermore, FIG. 14 illustrates a manner wherein program information obtained by a reservation procedure of the video tape recorder 63 described above is sent to a printer 77, which can print a label, through a cable 76 so that a title and so forth of the program are printed by the printer 77. A label 78 on which a title and so forth of a program are printed is adhered as a label 78 of a recording medium such as a video tape cassette 79 to the video tape cassette 79. Alternatively, program information may be printed on an index card by the printer 77.

Figure 15:
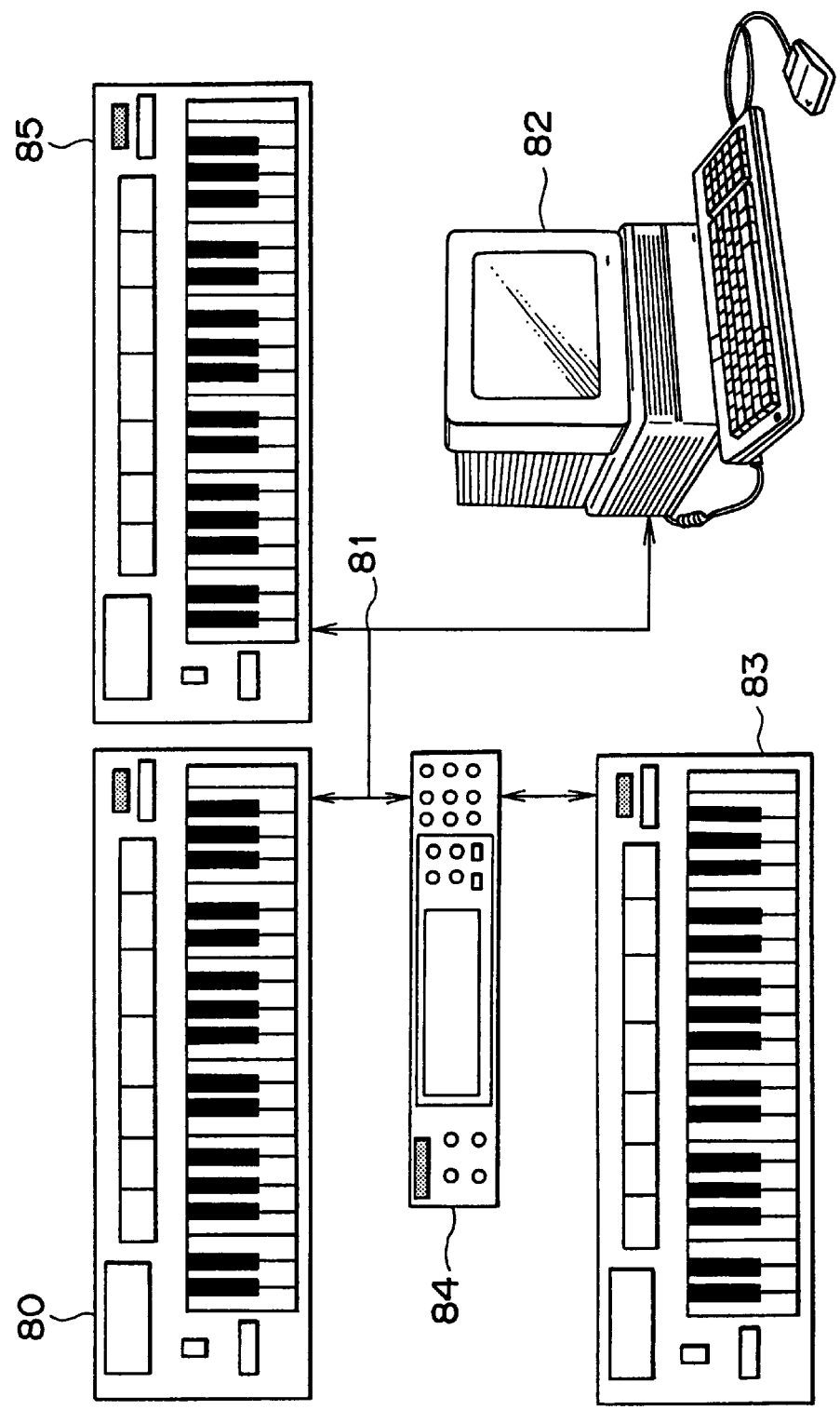
FIG. 15 is a schematic illustration showing an electronic musical instrument system to which the present invention is applied.

Referring now to FIG. 15, there is shown an electronic musical instrument system to which the present invention is applied. The electronic musical instrument system shown includes a synthesizer 80, another synthesizer 83 and a further synthesizer 85 which are connected to a sound source and controller 84. Also a computer 82 is connected to the sound source and controller 84 and the synthesizers 80, 83 and 85 by a cable 81. If a tune and control data and so forth superposed on the tune are transmitted from any of the sound source and controller 84 and the synthesizers 80, 83 and 85, then the tune is sounded, and the computer 82 can be controlled with the control data. Further, if the synthesizer 83 transmits a tune and control data and so forth superposed on the tune, then the other synthesizers 80 and 85 and so forth can be controlled. In other words, control of a tone, sounding timings and so forth can be performed.

It is to be noted that the apparatus which can control is not limited to the computer 82 but may be selected from various apparatus. Further, the electronic musical instruments are not limited to the synthesizers 80, 83 and 85, but may be various electronic musical instruments. Furthermore, data of a tune and/or control data may be transmitted by a MIDI (Musical Instrument Digital Interface). Further, the means for superposing control data on a tune may be means similar to the means shown in FIG. 3.

Figure 16:
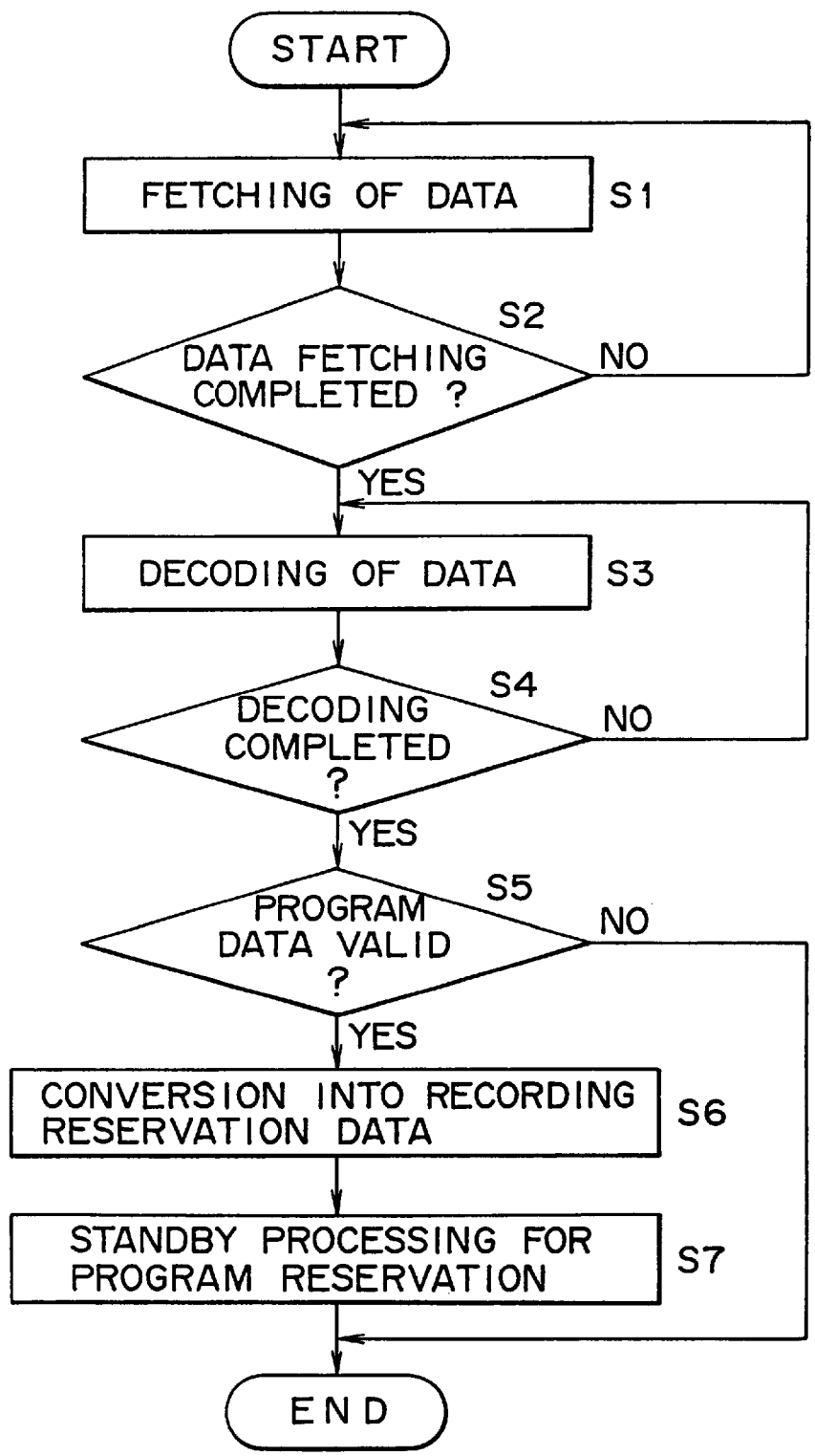
FIG. 16 is a flow chart illustrating a procedure of recording reservation of a program which is performed for a video tape recorder making use of program information superposed on a broadcasting signal in accordance with the present invention.

Referring now to FIG. 16, there is illustrated in flow chart a procedure of data signal processing when recording reservation of a program to be recorded by the video tape recorder (VTR) described hereinabove with reference to FIGS. 10A to 10D is to be performed.

After the recording reservation procedure is started, data of program information superposed on an audio information signal is fetched in step S1. Then, if it is determined in step S2 that the fetching of data is completed, then decoding of the fetched data is performed in step S3. For example, where the data is a predetermined code signal, decoding of the code signal is performed. It is to be noted that, if it is determined in step S2 that the fetching of data is not completed, then the control returns to step S1 to continue the fetching of data.

Then, if it is determined in step S4 that the decoding of the fetched data is completed, then the control advances to step S5, in which it is determined whether or not the decoded program information data is valid. It is to be noted that, if it determined in step S4 that the decoding of the fetched data is not completed, then the control returns to step S3 to continue the decoding of the data.

It is to be noted that, in step S5, it is determined whether the program information data is data for a time later than the present point of time and whether the program start time of the program information data is within 24 hours from the present point of time. If the two requirements are satisfied and therefore the program information data is valid, then the control advances to step S6, in which the program information is converted into data for recording reservation. The data for recording reservation obtained by the conversion is displayed on the display unit, and recording reservation processing is performed. Then, in step S7, a standby condition for recording reservation is restored, thereby ending the recording reservation procedure. It is to be noted that, if the requirements described above are not satisfied in step S5 and it is not determined that the program information data is valid, then the processing in steps S6 and S7 is skipped and the recording reservation procedure comes to an end immediately.

Now, data transmission methods according to the present invention are described with reference to FIGS. 17 and 18.

The data transmission methods illustrated in FIGS. 17 and 18 utilize a sound masking effect to superpose a data signal of program information and so forth on an audio information signal. In the data transmission method illustrated in FIG. 17, a data signal inserted in any of frequency-level regions present on the opposite sides of a frequency band of ordinary voice and indicated as masking levels is not recognized when ordinary voice is reproduced. Then, program information data or the like can be obtained by separating and decoding the data signal. Accordingly, also by means of superposing a data signal making use of a masking effect of the frequency axis, a data signal can be superposed on ordinary voice without causing reproduced sound of the voice to be felt disagreeable.

Meanwhile, in the data transmission method illustrated in FIG. 18, a data signal inserted in any of time-level regions present on the opposite sides of a time region which is occupied by ordinary voice and indicated as masking times is not recognized when ordinary voice is reproduced. Then, program information data or the like can be obtained by separating and decoding the data signal. Accordingly, also by means of superposing a data signal making use of a masking effect of the time axis, a data signal can be superposed on ordinary voice without causing reproduced sound of the voice to be felt disagreeable.

It is to be noted that a data signal may be superposed in a region on both of the time axis and the frequency axis with which both of masking effects of the time base and the frequency axis can be obtained. Further, when a data signal is superposed, the level of the data signal may be varied adaptively in accordance with the level or the frequency of ordinary voice or, depending upon a condition of ordinary voice, a data signal may be superposed intermittently.

While, in the foregoing description, when to phase modulate a carrier signal with a data signal, two-phase modulation is performed, the phase modulation in the present invention is not limited to two-phase modulation, and multiple-phase modulation such as four-phase modulation or eight-phase modulation may be used instead.

Further, while, in the foregoing description, a data signal is superposed on an audio information signal, a data signal may be sent making use of the SAP or the TELEMETORY.

Furthermore, while the foregoing description is given principally of recording reservation, also automatic program reproduction, various automatic processing operations and so forth can be performed. Moreover, as object media, magnetic recording media such as a floppy disk, a mini disk (MD) and a tape streamer, magneto-optical recording media such as an optical disk (MO), optical recording media such as a film, a digital video disk (DVD), a compact disk read-only memory (CD-ROM) and a compact disk (CD, CD-V), and mechanical recording media such as a record may be used.

Having now fully described the invention, it will be apparent to one of ordinary skill in the art that many changes and modifications can be made thereto without departing from the spirit and scope of the invention as set forth herein.

What is claimed is:

1. A data transmission method for transmitting an audio information signal with a data signal superposed thereon, comprising the steps of:

phase modulating a phase of the audio information signal with the data signal; and transmitting both the audio information signal prior to the phase modulation and the phase modulated audio information signal by a first channel and a second channel, respectively, which are included in a band for transmission of audio data.

2. A data transmission method according to claim 1, wherein the audio information signal is phase modulated with the data signal such that, at a delineating point of sound of the audio information signal, a phase of the sound is shifted.

3. A data transmission method according to claim 1, wherein the audio information signal is phase modulated with the data signal at a portion of the audio information signal which represents fixed audio in a predetermined period which makes a unit of repetition.

4. A data transmission method according to claim 1, wherein the audio information signal to be transmitted by the first channel and the second channel is shifted by a predetermined phase amount after each period of a synchronizing signal, and the audio information signal to be transmitted by the second channel is further phase modulated with the data signal which is synchronized with the synchronizing signal.

5. A data reception method for receiving a signal including an audio information signal on which a data signal is superposed, comprising the steps of:

receiving the audio information signal and a modulated audio information signal, which includes the audio information signal phase modulated with the data signal, in an audio data band; and demodulating the modulated audio information signal phase modulated with the data signal using the received audio information signal as a reference signal to generate the data signal.

6. The method of claim 5, further comprising:

generating a screen display including data related to the generated data signal.

7. A data transmission apparatus for transmitting an audio information signal with a data signal superposed thereon, comprising:

phase modulation means for phase modulating a phase of the audio information signal with the data signal;

addition means for adding the phase modulated audio information signal outputted from said phase modulation means and the audio information signal which is not in a phase modulated condition to generate a combined signal; and transmission means for transmitting the combined signal outputted from the addition means.

8. A data transmission apparatus according to claim 6, wherein said phase modulation means phase modulates the audio information signal with the data signal such that, at a delineating point of sound of the audio information signal, a phase of the sound is shifted.

9. A data transmission method according to claim 7, wherein said phase modulation means phase modulates the audio information signal with the data signal at a portion of the audio information signal which represents fixed audio in a predetermined period which makes a unit of repetition.

10. A data transmission apparatus according to claim 6, wherein said phase modulation means includes:

first phase modulation means for phase shifting the audio information signal, which is to be transmitted without being phase modulated, by a first predetermined phase amount in synchronism with a synchronizing signal;

second phase modulation means for phase modulating the audio information signal with the data signal which is synchronized with the synchronizing signal to generate a modulated audio information signal; and third phase modulation means for phase shifting the modulated audio information signal outputted from said second phase modulation means by a second predetermined phase amount in synchronism with the synchronizing signal.

11. A data reception apparatus for receiving a signal including an audio information signal on which a data signal is superposed, comprising:

reception means for receiving the audio information signal and a modulated audio information signal, which includes the audio information signal phase modulated with the data signal, in a band allocated to audio data; and demodulation means for demodulating the modulated audio information signal phase modulated with the data signal using the audio information signal received by said reception means as a reference signal to generate the data signal.

12. A data reception apparatus according to claim 11, wherein said demodulation means detects whether or not the audio information signal and the modulated audio information signal phase modulated with the data signal are coincident with each other to demodulate the data signal.

13. A data reception apparatus according to claim 10, further comprising:

processing means for processing the data signal demodulated by said demodulation means to allow the information based on the demodulated data signal to be displayed on a display unit.

14. A method of transmitting and receiving audio signals combined with data signals, comprising the steps of:

generating an audio information signal and a data signal;

phase modulating, with said data signal, a phase of said audio information signal, and in accordance therewith generating a phase modulated audio signal;

transmitting said audio information signal and said phase modulated audio signal by a first channel and a second channel, respectively, that are included in a band for transmission of auditory data;

receiving said audio information signal and said phase modulated audio signal; and demodulating said phase modulated audio signal using said audio information signal as a reference signal, and in accordance therewith generating an output signal corresponding to said data signal.

15. A data transmission apparatus for transmitting an audio information signal with a data signal superposed thereon, comprising:

an addition modulation circuit configured to phase modulate, with the data signal, a phase of the audio information signal, and in accordance therewith to generate a phase modulated audio signal;

said addition modulation circuit being further configured to add said phase modulated audio signal and said audio information signal, and in accordance therewith to generate a combined signal; and an antenna configured to transmit said combined signal.

16. A data transmission apparatus according to claim 15, wherein said addition modulation circuit is further configured to phase modulate, with the data signal, the audio information signal such that, at a delineating point of sound of the audio information signal, a phase of the sound is shifted.

17. A data transmission method according to claim 15, wherein said addition modulation circuit is further configured to phase modulate, with the data signal, the audio information signal at a portion of the audio information signal which represents fixed audio in a predetermined period which makes a unit of repetition.

18. A data transmission apparatus according to claim 15, wherein said addition modulation circuit includes:

a first phase shifter configured to phase shift the audio information signal, which is to be transmitted without being phase modulated, by a first predetermined phase amount in synchronism with a synchronizing signal;

a second phase shifter configured to phase modulate the audio information signal with the data signal which is synchronized with the synchronizing signal to generate a modulated audio information signal; and a third phase shifter configured to phase shift the modulated audio information signal outputted from said second phase shifter by a second predetermined phase amount in synchronism with the synchronizing signal.

19. A data reception apparatus for receiving a signal including an audio information signal on which a data signal is superposed, comprising:

an antenna configured to receive the audio information signal and a modulated audio information signal in a band allocated to audio data, wherein said modulated audio information signal includes the audio information signal phase modulated with the data signal; and a demodulation circuit configured to demodulate the modulated audio information signal phase modulated with the data signal using the audio information signal received by said reception means as a reference signal to generate the data signal.

20. A data reception apparatus according to claim 19, wherein said demodulation means detects whether or not the audio information signal and the modulated audio information signal phase modulated with the data signal are coincident with each other to demodulate the data signal.

21. A data reception apparatus according to claim 19, further comprising:

a microcomputer configured to process the data signal demodulated by said demodulation means to allow the information based on the demodulated data signal to be displayed on a display unit.

22. A signal detectable by a device and transmitted in a transmission medium, said signal generated by a process comprising the steps of:

phase modulating, with a data signal, a phase of an audio information signal, and in accordance therewith generating a phase modulated audio signal; and transmitting both said audio information signal and said phase modulated audio signal by a first channel and a second channel, respectively, which are included in a band for transmission of auditory data.

* * * * *